United States Patent [19]

Herzog

[11] Patent Number: 4,466,195
[45] Date of Patent: Aug. 21, 1984

[54] MEASURING MACHINE OF THE PORTAL VARIETY

[75] Inventor: Klaus Herzog, Oberkochen, Fed. Rep. of Germany

[73] Assignee: Carl-Zeiss-Stiftung, Heidenheim, Fed. Rep. of Germany

[21] Appl. No.: 445,683

[22] Filed: Dec. 1, 1982

[30] Foreign Application Priority Data

Dec. 23, 1981 [DE] Fed. Rep. of Germany ....... 3150978

[51] Int. Cl.$^3$ .............................................. G01B 5/00
[52] U.S. Cl. .................................... 33/174 L; 33/1 M
[58] Field of Search ............... 33/1 M, 174 L, 174 P, 33/169 R, 172 L, 172 R

[56] References Cited

U.S. PATENT DOCUMENTS

| 3,749,501 | 7/1933 | Wieg | 33/1 M X |
| 3,831,283 | 8/1974 | Pagella | 33/174 L X |
| 3,840,993 | 10/1974 | Shelton | 33/1 M |

FOREIGN PATENT DOCUMENTS 621955 8/1978 U.S.S.R. ............................. 33/1 M

*Primary Examiner*—Harry N. Haroian
*Attorney, Agent, or Firm*—Hopgood, Calimafde, Kalil, Blaustein & Judlowe

[57] ABSTRACT

The invention contemplates a measuring machine wherein a portal (2) is displaceable on a flat base plate (1) of granite. The bridge portion (3) of the portal (2) includes a guide rail (22) which is centrally fixed to the bridge portion (3) and extends in the x-direction of portal displacement. A separate superstructure (23) fixed to and upstanding from the base plate (1) provides support and guidance for the guide rail (22). In a manually operated embodiment, the operating knob for the use is arranged on a carriage which is displaceable along the bridge portion (3), in the y-direction.

Since points relevant to displacement force application (e.g., drive, center of gravity, guidance) are at approximately the same elevation, bending forces can introduce essentially only two kinds of error, namely, a lateral offset ($\Delta Y$) of the portal and/or an incremental rotation of the portal about the vertical (z). The invention provides for detection of these errors via a measuring device (30, 35), coacting between a leg (4) of the portal (2) and a reference lateral alignment (34) of portal-leg displacement in the x-direction. And the detected errors are then included by calculation in the measurement result determined by the machine.

10 Claims, 4 Drawing Figures

MEASURING MACHINE OF THE PORTAL VARIETY

BACKGROUND OF THE INVENTION

In known measuring machines of the portal variety, the means of x-direction guidance of the portal (i.e., against lateral displacement in the y-direction) is operative at one or both feet of the portal. In the case of manually operated machines, the measurement probe is driven by a knob on the z-measurement spindle, and this knob is grapsed by the operator, for control of machine movement in all three axes.

Such measuring machines are of limited precision since, even with careful development of the guide means, machine movement develops flexural moments, particularly on the portal and on the measurement spindle; the magnitude of such moments depends on the instantaneous position of the measurement head and on the acceleration or deceleration forces applied by the operator. Stiffening of the measurement spindle is possible only to a limited degree, since stiffening entails additional mass, and the acceleration and braking of the additional mass per se results in deformation of the portal. Furthermore, machine operation degrades, the greater the masses to be moved.

Bending forces occur also in motor-operated machines if the drive does not act precisely at the center of gravity of the displacement carriages.

U.S. Pat. No. 4,175,327 discloses a measuring machine of portal type in which the portal is moved via a drive which acts on the bridge portion of the portal in the vicinity of its center of gravity. Although transverse forces acting on the portal are reduced by this drive technique, as compared with a one-sided drive, they are not completely eliminated since the center of gravity, as distinguished from the point of application of the drive on the portal, is shifted as a function of y-axis position of the transverse carriage. Since x-direction guidance for the portal is via one of the two feet of the portal, deformation of the portal can occur, even for the case of this patented measuring machine.

BRIEF STATEMENT OF THE INVENTION

The object of the present invention is to provide a measuring machine of portal type with only small moving masses and in which mechanical deformations caused by drive forces acting other than at the center of gravity are minimized and have no effect on the precision of the measurement.

The invention achieves this object by providing portal guidance (against lateral displacement) via a guide rail attached to the bridge portion of the portal, the rail being further supported and guided in a separate housing mounted to the base plate of the machine, and by providing means for determining lateral deviations in x-direction guidance of the portal.

With such a construction, points relevant to force application on the portal (drive, center of gravity, guidance) are very close to each other and approximately at the same elevation, so that bending forces can occur only laterally with respect to the x-direction of portal guidance; however, the portal does not itself bend but merely experiences a lateral shift, attributable to deformation of bearings and/or to non-linearity in the x-direction guide means, leading to small angular displacements about the z-axis.

These guidance errors can, however, be determined at relatively little expense by measurement techniques, for example, be measures described in a patent application, entitled "Method and Apparatus for Determining and Correcting Guidance Errors", Ser. No. 446,163, filed concurrently with the present patent application.

Furthermore, no great demands are made on bearing means in the housing, for x-axis guidance and lateral constraint, so that such bearing means can be developed at relatively little expense.

The means for determining guidance error, for use in correction of the measurement result, preferably utilizes two error-measurement probes which are carried by one foot of the portal and which slide along a reference surface which extends in the x-direction of portal displacement. Such a measurement system enables determination of both portal offset from the x-direction reference and portal rotation about the z-axis.

When using the invention as a manually operated machine, it is advisable to mount the operating knob on the carriage which is y-axis displaceable along the bridge portion of the portal, and to provide a separate (preferably a motor) drive for the z-measurement spindle. In this way, bending of the measurement spindle is avoided and the latter can, accordingly, be of lightweight construction.

If the measuring machine is to have motor drive for all axes of movement, then the drive for the portal is preferably contained within the housing which also provides x-axis guided support of the portal, so that the portal drive can act on the guide rail, as via friction rollers.

DETAILED DESCRIPTION

An illustrative embodiment of the invention will be described in detail in conjunction with the accompanying drawings, in which.

Figure 1:
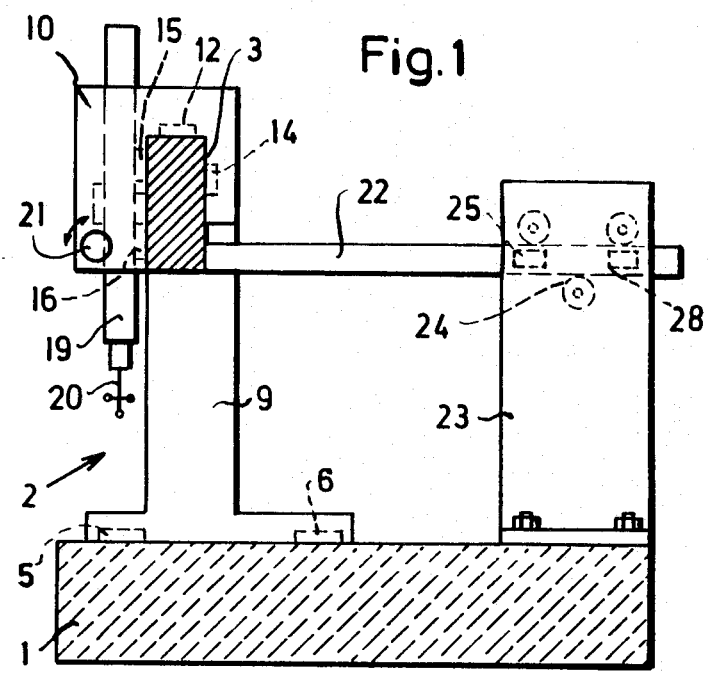
FIG. 1 is a vertical sectional view taken through the bridge of a portal-type measuring machine of the invention.
Figure 2:
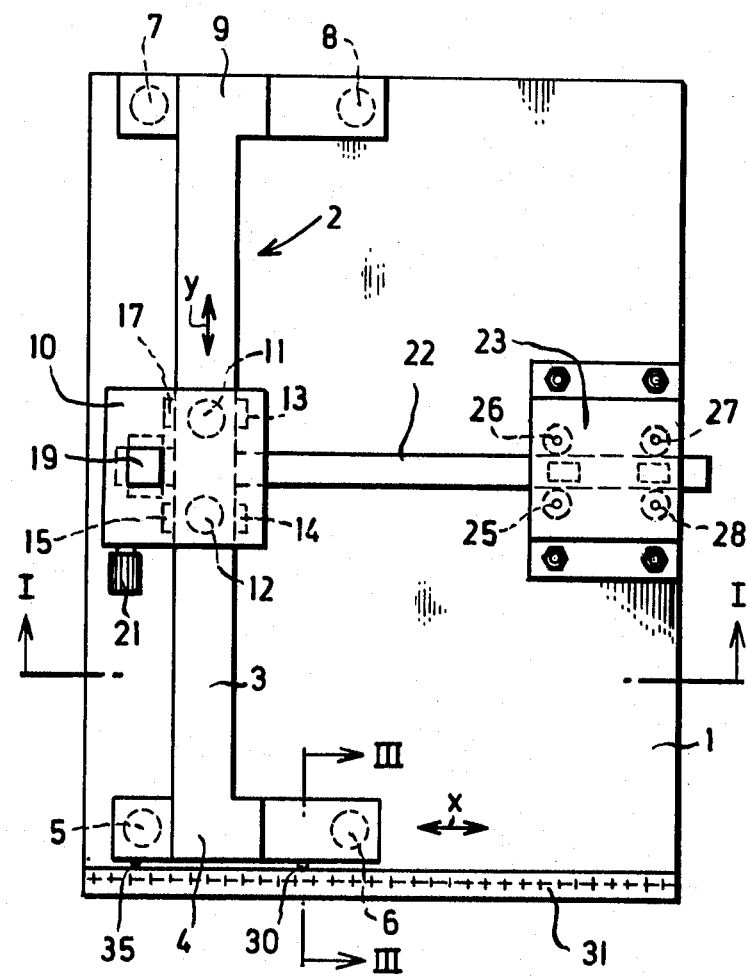
FIG. 2 is a plan view of the same machine, the section plane of FIG. 1 being shown at I—I in FIG. 2.

In FIGS. 1 and 2, a measuring machine of the invention has a base plate 1, for example of granite, the flat upper surface of which supports a portal 2. Portal 2 is formed of two columns or legs 4 and 9, and a bridge portion 3. Each foot of the columns 4, 9 incorporates a pair of air bearings 5, 6 and 7, 8 by means of which portal 2 may slide on the base plate 1.

The bridge portion 3 serves as a guide for a y-axis carriage 10, which is supported by a pair of air bearings 11, 12, and which is held against turning or tilting, by air bearings 13 through 18; bearing 18 is not shown in the drawings but will be understood to be located beneath bearing 17 and at the elevation of bearing 16. The y-axis carriage 10 contains bearings (not shown in detail) for guiding a vertically movable z-measurement spindle 19 which carries a work-contact probe head 20; the y-axis carriage 10 will also be understood to contain a motor drive for the measurement spindle 19. Both the y-axis carriage and the z-measurement spindle are well-known structural groups which do not require more detailed explanation.

Behind portal 2, a housing 23 is shown fixed to base plate 1, via four bolts. Housing 23 contains four roller bearings, 25 through 28, for lateral constraint of a guide rail 22 which is rigidly secured to the center of bridge portion 3; housing 23 also contains another bearing 24 to sustain weight of the guide rail 22. The bearings 25 through 28 assure guidance of portal 2 in the x-direction.

Figure 4:
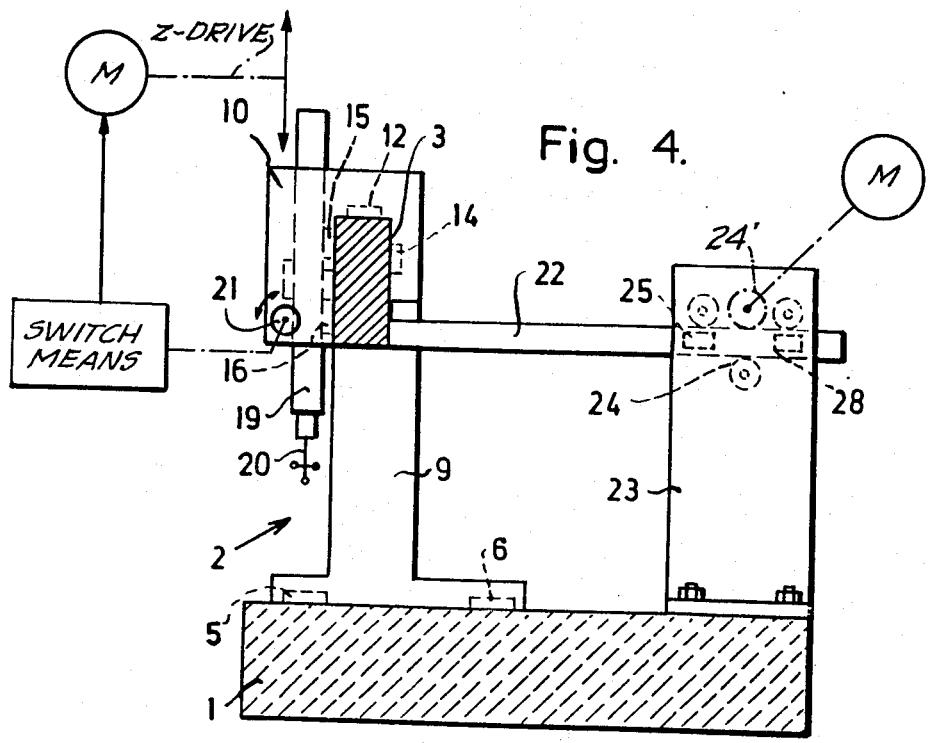
FIG. 4 corresponds to FIG. 1, to show a motor operated embodiment.

In the simplest embodiment shown here, the measuring machine has a knob 21, mounted to the carriage 10, by which the machine can be operated manually along the two axes x and y. Knob 21 will be understood to be coupled with a switch via which electric drive (not shown) for the z-measurement spindle is operated, by turning the knob; as schematically suggested in FIG. 4, for z-drive control. Of course, it is also readily possible to provide motor drive of the machine along the x and y axes; in the latter event, the x-drive for the portal 2 will be understood to be suitably integrated into housing 23 for action as via friction-roller engagement with guide rail 22; as schematically indicated in conjunction with friction roller 24' in FIG. 4.

Figure 3:
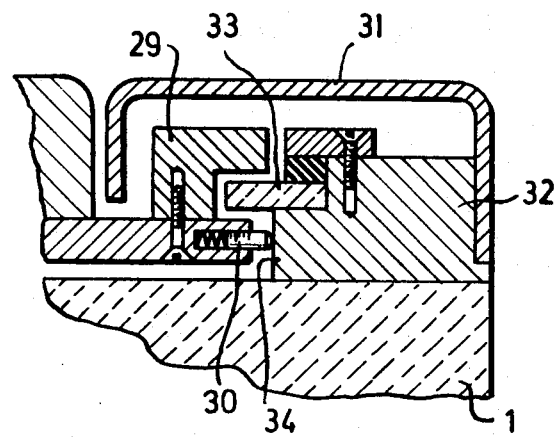
FIG. 3 is an enlarged sectional detail, taken along the line III—III of FIG. 2.

As shown in the detail of FIG. 3, a graduated glass rule 33 is mounted to a cleat 32 on the base plate 1 and extends in the direction of portal displacement and provides a reference alignment of x-axis displacement. Said glass rule is read by an optoelectronic index system of known construction (not shown in the drawing) which will be understood to be carried by a part 29 secured to the foot of column 4. A cover 31 protects rule 33 and the involved measurement system from dirt and outside light.

Since rigidity and linearity of the guide rail 22 are less than optimum, two guidance errors of the portal 2 may occur, namely:

1. Offset of the portal 2 in the y-direction.
2. Rotation of the portal about its center of gravity.

To eliminate the effect of these possible errors on the result of the measurement, two additional measurement contact probes 30 and 35 of known construction, for example inductance sensors, are carried by portal 2 in the vicinity of part 29 which carries the index for reading rule 33, and the sensor pins of said probes are slidable along a vertical surface 34 of cleat 32. As shown in FIG. 2, probes 30 and 35 are disposed in spaced-apart relation from each other in the x-direction.

A measurement machine of the invention will be understood to include a computer (not shown) to which the outputs of the measurement probes are connected and to which output signals of measurement systems for the three machine axes are also fed. Once the coordinates have been computed for each measurement point touched by work-contact probe 20, the x and y coordinates are then corrected in accordance with detected (angularity) obliqueness and lateral offset of the portal.

In this connection, any offset in the y-direction is calculated from the sum of the measured values of the additional sensors 30 and 35, while the obliqueness or angular shift of the portal about the vertical is calculated from the difference between the measured values of the sensors 30 and 35 and their distance apart.

The indicated error correction implies that the surface 34 along which probes 30 and 35 slide is sufficiently flat in the x-direction over the measurement range of the machine and that it is aligned precisely parallel to the measurement axis. If these prerequisites are absent or cannot be maintained due to reasons of manufacturing expense, it will be understood to be possible to measure deviations of the surface 34 from the true x-axis of the machine and to store them in the form of a correction function in the computer, as is also described in applicant's above-mentioned patent application, entitled "Method and Apparatus for Determining and Correcting Guidance Errors".

What is claimed is:

1. In a measuring machine, a portal frame and a flat horizontal base, said portal frame comprising two upstanding columns slidable on said base and a horizontal bridge rigidly connecting said columns at vertical offset from said base, a movable carriage having y-axis guidance along said bridge, and a work-contact measurement head having z-axis vertical slide suspension from said carriage; x-axis guide means for said portal including a horizontal guide rail rigidly secured to said bridge and extending normal to the direction of y-axis guidance on said bridge, upstanding superstructure mounted to said base and including x-axis guide means for said guide rail; and means for determining lateral deviations in the x-direction guidance of the portal.

2. A measuring machine according to claim 1, in which an elongate member is mounted to said base to provide an x-direction reference surface adjacent one of said columns, and in which said means for determining lateral deviations in x-direction guidance comprises two measurement probes carried by said one column and in slidable engagement with the reference surface, whereby the sum or average of said outputs may provide an error signal to correct for lateral deviation of portal displacement with respect to said reference surface, and further whereby the difference between said outputs may provide an error signal to correct for angular displacement of said portal about a vertical axis.

3. A measuring machine according to claim 1, characterized by the fact that said columns slide directly on the flat surface of said base.

4. A measuring machine according to claim 1, in which a manual operating knob mounted to the carriage is operable to displace the portal in the x-direction and also to displace the carriage along the bridge in the y-direction.

5. A measuring machine according to claim 4, in which said operating knob is positioned on the carriage approximately at the elevation of the center of gravity of the portal.

6. A measuring machine according to claim 4, in which a z-measurement spindle is supported by said carriage for motor-driven vertically guided displacement, and in which said operating knob includes switch means for control of the drive motor of the measurement spindle (19).

7. A measuring machine according to claim 1, in which an x-direction motor drive for the portal is arranged in said superstructure and has x-direction driving connection to said guide rail.

8. In a measuring machine, a portal frame and a flat horizontal base, said portal frame comprising two upstanding columns slidable on said base and a horizontal bridge rigidly connecting said columns at vertical offset from said base, a movable carriage having y-axis guidance along said bridge, and a work-contact measurement head having z-axis vertical slide suspension from said carriage; x-axis guide means for said portal including a horizontal guide rail rigidly secured to said bridge and extending normal to the direction of y-axis guidance on said bridge, upstanding superstructure mounted to said base and including x-axis guide means for said guide rail; and means for determining lateral deviations form true x-axis displacement of said portal, said last-defined means comprising an elongate member mounted to said base and providing an x-direction reference surface adjacent one of said columns, and two probes carried by said one column at x-direction spacing from each other, said probes being adapted for laterally offset coaction with said reference surface and producing separate electrical-signal outputs in response to detected changes in lateral offset, whereby the sum or average of said outputs may provide an error signal to correct for lateral deviation of portal displacement with respect to said reference surface, and further whereby the difference between said outputs may provide an error signal to correct for angular displacement of said portal about a vertical axis.

9. A measuring machine according to claim 1, in which said last-defined means comprises an elongate member mounted to said base and providing an x-direction reference surface adjacent one of said columns, and at least one probe carried by said one column, said probe being adapted for laterally offset coaction with said reference surface and producing an electrical-signal output in response to detected changes in lateral offset.

10. A measuring machine according to claim 7, in which said driving connection is via friction-roller engagement to said guide rail.

* * * * *